March 9, 1965 R. A. WILLIAMS 3,172,975
ELECTROMAGNETIC PIVOTAL ARMATURE CONTACT MECHANISM
Filed Nov. 4, 1960 4 Sheets-Sheet 1

INVENTOR
ROBERT A. WILLIAMS

BY Cushman, Darby & Cushman
ATTORNEYS

March 9, 1965 R. A. WILLIAMS 3,172,975
ELECTROMAGNETIC PIVOTAL ARMATURE CONTACT MECHANISM
Filed Nov. 4, 1960 4 Sheets-Sheet 3

INVENTOR
ROBERT A. WILLIAMS
BY Cushman, Darby & Cushman
ATTORNEYS

March 9, 1965   R. A. WILLIAMS   3,172,975
ELECTROMAGNETIC PIVOTAL ARMATURE CONTACT MECHANISM
Filed Nov. 4, 1960   4 Sheets-Sheet 4

INVENTOR
ROBERT A. WILLIAMS

BY Cushman, Darby & Cushman
ATTORNEYS

United States Patent Office 3,172,975
Patented Mar. 9, 1965

3,172,975
ELECTROMAGNETIC PIVOTAL ARMATURE
CONTACT MECHANISM
Robert A. Williams, Fort Worth, Tex., assignor to
Talon, Inc., Meadville, Pa.
Filed Nov. 4, 1960, Ser. No. 67,436
41 Claims. (Cl. 200—87)

This invention relates to an electromagnetic switching device, and is a continuation-in-part of my copending application, Serial No. 753,660, filed August 7, 1958, and now abandoned.

The invention of this application has many features in common with my earlier application, but departs therefrom as to other features. Some of the common features include mounting the armature not only for pivotal movement within the coil aperture, but also for free sidewise movement thereof so as to effect a universal or swivel movement. My earlier application provides for such swivel movement, in one embodiment, by the use of two pivot pins which have a smaller point radius than the seats in which they are situated. The present invention utilizes this type of armature mounting in one embodiment, but also presents a modified universal movement in which ring bearings preferably of the jewel type are employed with shaft means running therethrough, the shaft mean being flattened on opposite sides at least within the ring bearings.

Figure 18:
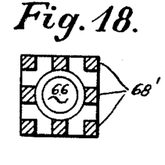

A further feature of this invention which is common to the above application is the resilient mounting of the pivot seats. In both that application and the present one, spring bias means are employed to accomplish such resilient mounting. In my former application, particularly as shown in FIGURE 18 thereof, ball bearings are used as the pivot seats and these bearings are spring mounted. In the present application, V pivot seats are disposed in the armature body, and in one instance a tubular spring maintains the seats in a resilient mount. With resilient mounting of either type, the switching device is not damaged even though it is subjected to shock, vibration or the like.

A further feature common to my earlier above-mentioned application and this application is the elimination of effects of contact, thermal, and electrostatic E.M.F.'s by provision of novel lead and contact structures and arrangements as will hereinafter be described.

Other features common to the above application and this one will become apparent upon reading this specification.

The electromagnetic switching device of this invention, as well as the invention in my above-mentioned application, has many uses. One of its main utilizations is as a chopper relay or modulator, although it may equally as well be employed as a vibrator, polarized relay with or without snap action, a frequency standard, and the other many uses in which single or double pole, single throw switches are employed.

Numerous prior art designs of switching devices are well known. Among those which employ a reed for resonating purposes or the like, there are inherent disadvantages, since one end of the reed is rigidly mounted to a part of the switching device which does not move in response to excitation. Such a reed is greatly affected by external shock and vibration in two planes. Additionally, extra driving force is required to bend the reed except at its resonant point. Since the reed is unmovably mounted at one end, only half of the magnetic field produced by the surrounding coils may be used and the fixed end of the reed actually opposes the magnetic force and causes production of much heat within the device. Further prior art devices utilize the free end of the reed to cause electrical contact therebetween and a resilient contact, thereby effecting contact bounce and chatter. Also, thermal, contact, and electrostatic E.M.F.'s are generated and present in the prior art devices. In order to minimize the effect of external shock or vibration and the necessity for extra driving force, the prior art devices are designed to overdrive the reed, thereby requiring a unit of specific size and weight so as to prohibit true miniaturization and efficient use of power.

In contradistinction to the prior art devices, the switching device of this invention has none of the foregoing disadvantages, but has many advantages which will become apparent later, and can be truly miniaturized with the encasement being so small as to occupy only .020 cubic inch, no limitation being intended.

It is one of the objects of this invention to provide an electromagnetic switching device which overcomes all of the above-mentioned disadvantages of the prior art.

It is another object of this invention to provide an electromagnetic switching device which may be miniaturized to an extent greater than heretofore possible.

Another object of the invention is to provide an electromagnetic switching device in which the armature assembly is at least pivotally mounted and includes a reed fixedly mounted in a movable armature assembly.

Another object of this invention is the provision of novel and improved swivel movement for an armature assembly.

A further object of this invention is the provision of novel and improved means for resiliently mounting the pivot seats of an armature assembly so as to preclude damage to the armature assembly or the electrical contacts associated therewith even if the unit is subjected to shock, vibration or the like.

Another object of this invention is the provision of a novel multi-fingered shorting contact secured to a reed which is fixedly mounted in a pivotally mounted armature body.

Another object of this invention is to eliminate the effects of thermal, contact, and electrostatic E.M.F.'s.

Another object of this invention is the provision of effective means for obtaining proper shorting element and contact alignment and spacing.

Another object of this invention is the provision of structure and arrangements to eliminate contact bounce.

Another object of the invention is the provision of effective shielding means for the field of the driving element of the electromagnetic switching device.

Another object of the present invention is the provision of an encasement for an electromagnetic switching device, which encasement includes permanent magnet means cooperating with the magnetic circuit of the device for causing desired switching action, plus magnetic and electrostatic shielding for the contacts of the device, said encasement being mountable on a circuit board with the contacts of the device extending respectively as single pieces to terminal points on the board.

Other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

Figure 1:
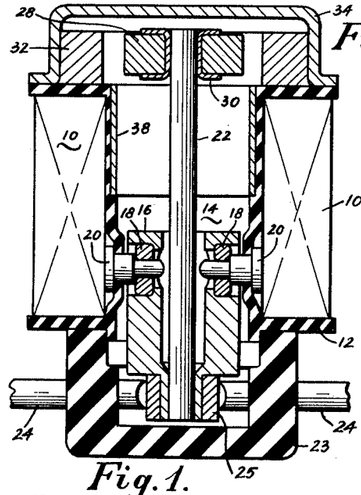
FIGURE 1 illustrates a low frequency embodiment of the invention.

The electromagnetic switching device as shown in FIGURE 1 includes coil means which may be a single coil, tapped coil, or double coil, but is preferably a single coil 10 disposed in a bobbin-like coil support form 12. The coil bobbin may be of copper or brass with a thin wall construction, but is preferably a ceramic or other non-metallic type bobbin for better performance because of elimination thereby of reluctance due to the shorted turn of metallic bobbins.

The armature assembly 14 is mounted within the elongated aperture defined by the coil means and its support 12 in such a manner as to allow movement of the armature assembly not only in the two opposed pivotal directions when coil 10 is energized, but also in opposing sidewise directions to give a limited, but free, universal or swivel movement ability to the armature assembly. This general feature is disclosed in my earlier above-mentioned application, but is accomplished in FIGURE 1 of the present application in a different manner. Mounted in the armature body 16 of the armature assembly, and on opposite sides thereof so as to be spaced as far apart as possible, are two ring bearings 18 which are preferably of sapphire or of other jewel-like material. Cooperating with each of the bearings 18 is shaft means such as pivot pins 20 rigidly secured in coil form 12 and extending into the aperture of the bearings.

Figure 2:
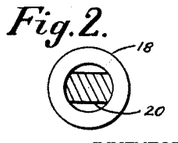
FIGURE 2 shows a ring bearing and shaft flattened for swivel movement of the armature.

As shown in FIGURE 2, the aperture of bearings 18 is circular, and at least the portion of pins 20 which extend through the respective apertures is partially circular in cross-section with two opposing sides thereof being slightly flat as shown. In this manner, armature body 16 which is secured to bearings 18 may be rotated about pins 20, and may also freely move slightly to the left or right as viewed in FIGURE 1.

Figure 3:
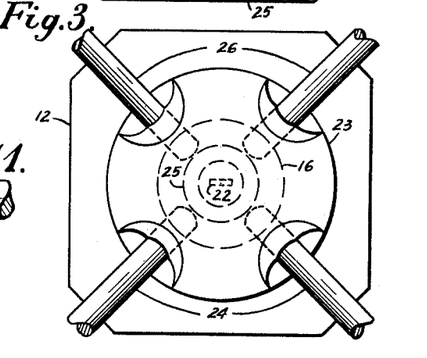
FIGURE 3 is an end elevational view of FIGURE 1.

Besides the armature body 16 which is preferably a permanent light weight magnet, the armature assembly includes reed 22 preferably of rectangular cross-section as shown in FIGURE 3. For relatively low, low frequency operation, i.e., 0 to 60 cycles for example, reed 22 is connected at its lower end in FIGURE 1 to the interior of, and at the end of, armature body 16 which protrudes from the aperture defined by coil 10. With this arrangement, the reed 22 can be made longer and can therefore have a larger diameter for a given resonant frequency. For operation at higher frequencies, reed 22 may be shortened and connected to armature body 16 at the end thereof which does not protrude from the coil aperture; that is, connection of the reed to the armature body may be as shown in FIGURE 4.

Figure 4:
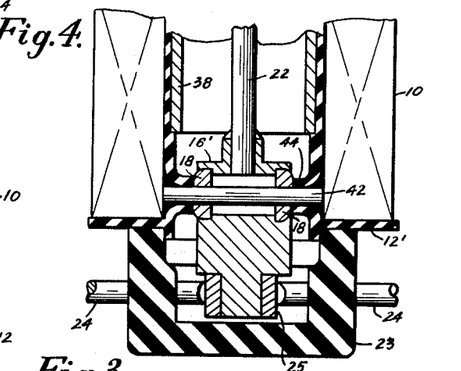
FIGURE 4 is a modification of FIGURE 1 for purposes of higher frequency operation.
Figures 5, 6, 7, 8, 9, 13:
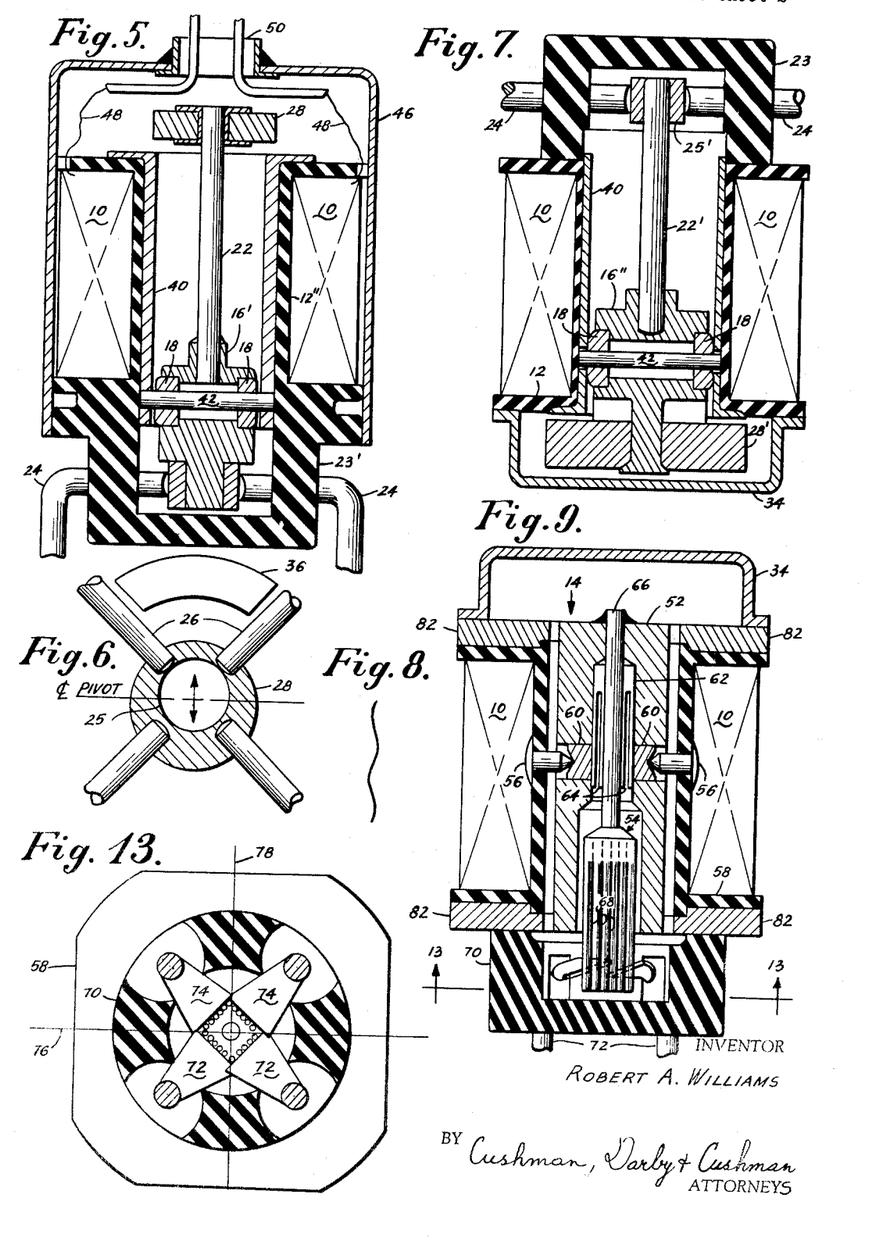
FIGURE 5 illustrates another embodiment of the invention.
FIGURE 6 is a functional schematic relating to the operation of any of the foregoing illustrated embodiments.
FIGURE 7 illustrates another embodiment of the invention with the contacts being disposed adjacent the free end of the reed.
FIGURE 8 illustrates a longitudinal schematic elevational view of a reed for snap action purposes.
FIGURE 9 illustrates another embodiment of the invention.
FIGURE 13 is a cross-sectional view taken along the lines 13—13 of FIGURE 9.

In the embodiment of FIGURE 1, as well as in FIGURES 4 and 5, the outermost part of the protruding end of armature body 16 as it extends in part in non-metallic end cap 23 is diminished in size and adapted with a contact ring 25 to form a shorting element as between the two pairs of contacts 24 and 26 when moved in the two opposing pivotal directions. The arrangement of contacts 24 and 26 is similar to that shown in FIGURE 6 of my earlier above-mentioned application. Regardless of misalignment of either or both of the contacts in pair 24, or in pair 26, the universal or swivel mounting of the armature assembly allows each pair of contacts to be positively contacted. That is, even though one of the two contacts in pair 24 is contacted before the other thereof, both are contacted and shorted by the shorting element portion of armature body 16 when coil 10 is energized to cause movement of the armature assembly in the appropriate direction.

It may be noted in FIGURE 3, as well as in FIGURES 4 through 7 of my earlier above-mentioned application, that at least part of the contact surface (i.e., the contact end) of each paired contact diverges relative to the other contact surface in the pair at least in part in a general direction toward the shorting element; that is, generally toward the plane which passes transversely through the center of the armature body orthogonal to a plane containing the two opposing pivotal movements of the armature.

At the upper end of reed 22 as viewed in FIGURE 1, there is disposed on the part of the reed protruding from the coil aperture a permanent magnet 28, preferably of the ceramic type for lightweight and small dimensional purposes. The use of magnet 28 in combination with armature assembly 14 allows the pivot pins 20 to be closer to the lower end of coil 10 and yet maintain armature balance with the center of gravity at the pivot points. Magnet 28 is fastened to the reasonating end of the armature assembly, i.e., to the reed, by metalizing the magnet hole area for soldering or brazing, or by setting an eyelet 30 into the magnet's central hole and press setting the eyelet onto the reed. The hole in the magnet can be rectangular or irregular-shaped to prevent rotation thereof on the eyelet, or alternatively, a round hole may be used by bonding the eyelet and magnet together with high temperature epoxy. Rather than press setting the eyelet to the reed, the eyelet is preferably secured to the reed by soldering, brazing or welding.

The metal facing of eyelet 30 as formed by flanging the eyelet under and over magnet 28 is preferable since such facing deflects, narrows or intensifies the magnet's lines of force, making the magnet approximately 30% more efficient than a magnet without such facing. In addition, a ferrous or laminate ring 32 disposed within the end cap 34 so as to surround magnet 28 may be employed to provide the device with a snap action and also to increase the amplitude of the armature movement. Magnetic bias adjustment and/or normally closed contact requirements may be obtained by using a ferrous sector or permanent magnet 36 (FIGURE 6) at the magnet end of coil 10 or by center tapping the coil. Further, a ferrous sleeve insert 38 (FIGURES 1 and 4) may be soldered inside the coil bobbin 12. Such a sleeve concentrates the magnetic force of the coil to advantage. Alternatively, as shown in FIGURE 5, a ferrous sleeve 40 which is flanged over the upper end of coil 10 for further concentration of the field may be employed.

As above mentioned in relation to FIGURE 1, armature assembly 14 may be pivoted by employing in the bearings 18, shaft means, such as the two relatively short pins 20. In the higher frequency operating devices, such as shown in FIGURES 4 and 5, reed 22 attaches to the armature body at its upper end, rather than going through the body and attaching thereto at its lower end. Consequently, the shaft means for bearings 18 in these two figures is shown alternatively as a single bearing shaft 42 extending through both of the bearings. In FIGURE 4, the ends of shaft 42 are secured in extruded portions 44 of a coil form 12'. However, in FIGURE 5 the ends of shaft 42 are mounted in ferrous sleeve 40 for convenience. In both of FIGURES 4 and 5, shaft 42 is flattened on its opposite sides, at least in the area of bearings 18, as previously indicated in reference to bearing pins 20 of FIGURE 1 and FIGURE 2. In either case, the shaft means is preferably a gold alloy that requires no lubrication when used with sapphire bearings 18.

FIGURE 5 also shows an embodiment wherein the end cap 23' and coil form 12" are integral and of nonmetallic material, such as a one-piece ceramic body. Casing 46, in FIGURE 5, acts not only as the end cap 34 of FIGURE 1, but also encases coil 10, while providing for input leads 48 to the coil through header 50.

FIGURE 6 represents a functional schematic of the operation of any one of the devices shown in FIGURES 1, 4 and 5, and as illustrated, shows magnet 28 being deflected downward by the coil field so that the shorting element of the armature body 16 is contacting the pair of contacts 26. In operation, when the coil field deflects the magnet upward, the armature body will contact the pair of contacts 24. Such shorting of the contacts, as previously indicated, will occur even though the armature body touches one of a pair of contacts before it does the other, since the armature body is capable of not only pivoting up and down, as viewed in FIGURE 6, but also of moving to the right or left by virtue of the swivel action provided by the flattened areas of the shaft means.

Still another embodiment of the invention is shown in FIGURE 7, and in this case the contact end and magnet end of the armature assembly are reversed relative to their disposition in FIGURES 1, 4 and 5. That is, armature body 16" at its lower end which protrudes from the coil aperture is arranged to hold magnet 28', while the protruding end of reed 22' is adapted to short the contacts extending within end cap 23. Instead of end cap 34, a casement, such as shown in FIGURE 5, may be employed as part of the magnetic circuit. The armature body 16" is shown mounted with a single piece shaft 42 ending in sleeve 40, as in FIGURE 5, but it is to be understood that short pins, such as pins 20 of FIGURE 1, may be employed as the shaft means in FIGURE 7. Additionally, reed 22' may be mounted similarly to the manner shown in FIGURE 1.

As previously indicated, reeds 22 and 22' of the different embodiments shown in FIGURES 1, 4, 5 and 7 preferably have a rectangular transverse cross-section but can be round, oval, partially flattened, a flat with the center cut out, or otherwise as desired. The material for the reed is a spring tempered, nonmagnetic alloy of super fatigue resistance properties, such as Elgiloy, Beryllium copper, or bi-metal alloys, where close resonant frequencies are required over a wide temperature range. Also, the reed and armature body can be fabricated from one piece of material. To produce a reed snap action for relay uses, the longitudinal cross-section of the reed may be undulating, as shown in FIGURE 8.

It should be noted that the contacts need not be positioned adjacent one of the ends of the armature assembly, though preferably so, since, for example, the contacts may be within the coil aperture in FIGURE 5 so as to be contacted by the central position of the reed, although such an arrangement requires greater length.

A further and preferred form of the invention is shown in FIGURE 9. In this modification, the armature assembly 14 includes armature body 52 and a reed mounted contact shorting element 54. In this embodiment, the armature assembly is mounted for movement in pivotal and sidewise directions in a manner like that referred to particularly in FIGURE 17 of my earlier above-mentioned application. That is, two pivot pins 56 are mounted in coil form 58, and each of the pivot pins has a pivot point which forms an angle less than the angle of the V in seats 60. As a specific example, the points of pins 56 may be approximately 60°, while the V of seats 60 may be approximately 90°. In this manner, armature assembly 14 is provided with free, but somewhat limited, universal or swivel movability in response to excitation of coil 10.

Figure 10:
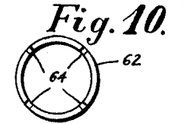
FIGURE 10 illustrates an end elevational view of the tubular spring of FIGURE 9.

As a further feature of the invention, pivot seats 60 are resiliently mounted for purposes of preventing damage to the device even though it is subjected to shock, vibration, or the like. This is also a feature which is common to my above-mentioned earlier application, and is therein shown in FIGURE 18 by the spring mounting of ball bearings 122 which act as seats for the larger pivot bearing 118. However, the resilient support for the armature mounting means in this application is of considerably different form. As will be noted from FIGURE 9, the base or inward ends of seats 60 rest against a tubular spring 62 which is disposed in an aperture of the armature body 52. Spring 62 has a plurality of slots 64 which run longitudinally thereof. A transverse cross-sectional view of the spring is shown in FIGURE 10.

Shorting element 54 of FIGURE 9 represents one particular embodiment thereof, and includes reed 66 which is fixedly secured to the upper end of armature body 52. At its lower end, reed 66 has brazed, or otherwise secured thereto, a plurality of fingers 68. Actual construction of the shorting element may be best seen in FIGURES 11 and 12. Each of the fingers 68, though secured at one end to reed 66, are otherwise independent of each other and free to move relative to each other. Fingers 68 are secured to reed 66 so as to form an end or cross-sectional geometrical configuration, such as a square, in the manner shown in FIGURE 12. For ease in manufacturing, each of the fingers on a side of the square actually touch each other, but an air gap may be interposed between adjacent fingers, if desired. Also, it should be understood, that although four fingers 68 per side are shown in FIGURE 11, a greater or lesser number (even as few as one per side) could be used, if desired.

With reference again to FIGURE 9, it will be apparent that fingers 68 protrude from the coil aperture to within end cap 70 in which is disposed at least one pair, and preferably two pairs of contacts 72, 74 best seen in FIGURE 13. Each of the contacts in pairs 72 and 74 are formed of a single piece of material which extends from the edge thereof which is the contact surface to at least externally of end cap 70. The contact surfaces of the contacts 72 and 74 form, in combination, a geometrical configuration conforming to the geometrical configuration of fingers 68. As shown in FIGURE 13, such geometrical configurations are preferably squares. For a switching device in which there is to be make-before-break contact, the square formed by the contact surfaces of the contacts is made the same size as the square of the multi-fingered shorting element. However, for break-before-make applications, the square of the contact surfaces is made larger than that of the shorting element. Since each finger 68 is an individual contact of the shorting element, any initial misalignment of any one of the contacts in pairs 72 and 74, or the development of irregularities in the contact surfaces of such contacts, is obviated since each finger will deflect in varying degrees and make positive contact with each contact of one pair thereof when the armature assembly is deflected by energization of coil 10. That is, when the shorting element is moved downward, as viewed in FIGURE 13, regardless of the misalignment or contact surface irregularity of either one of the contacts of pair 72, each of the fingers 68 on the two lower adjacent sides of the shorting element will touch one of the contacts even though some fingers may make contact before others. With this arrangement of contacts and shorting element fingers, a desirable wiping action is also derived by the deflection of the contact fingers in the 90° V formed by a stationary contact pair.

Figure 14:
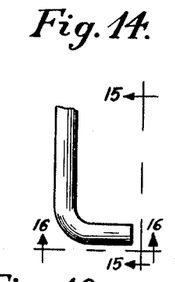
FIGURES 14, 15 and 16 illustrate the formation of each of the contacts in FIGURE 13.
Figure 15:
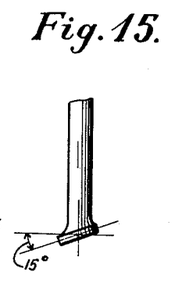
Figure 16:
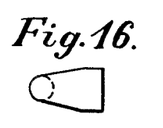

With relation to FIGURES 9 and 13, it will be noted that the swivel mounting of armature assembly 14 provides movement of the multi-fingered shorting element in two opposing pivotal directions, i.e., up and down, as shown in FIGURE 13, and in two opposing sidewise directions, i.e., to the left and right. The pivotal directions form a plane passing through the longitudinal axis of the aperture formed by coil 10 and through armature assembly 14. When the armature assembly is in an equilibrium position, such as that shown in FIGURE 13, the transverse plane thereof which passes at right angles through the above-mentioned plane and through the longitudinal axis of reed 66, provides a convenient means of reference, particularly in referring the disposition of each contact in pairs 72 and 74. It will be noted that each contact pair 72 lies substantially below the transverse plane which may be represented by line 76, and that each contact in pair 72 is substantially on opposite sides of the pivotal plane, which may be represented by line 78. Contacts 74 are similarly disposed relative to plane 78 and to plane 76 except that they are on the opposite side thereof relative to contacts 72. In this sense, the contact pairs are arranged similarly to those shown in FIGURE 3, and to those in FIGURE 6 of my earlier above-mentioned application. The particular form which each of the contacts in FIGURES 9 and 13 of this application may take is shown in detail in FIGURES 14, 15 and 16. Each contact as it passes through the end cap 70 of FIGURE 9 is preferably a round rod, the end of which is bent at 90° and flattened with the flattened portion being angulated at aproximately 15°. With such angulation, the contacts may be disposed in the manner shown in FIGURE 13 with the ends thereof overlapping but not touching, such ends or edges of the flattened portions being the contact surfaces which in pairs generally diverge at least in part toward the transverse plane 76. Preferably, the contact surface of each contact is highly polished, square and free of tool marks initially. Due to the inherent flexibility of the fingers 68 of the shorting element 54, it is not essential when using this type of shorting element to have any provision for sidewise movement of the armature pivots, nor is it essential to utilize tubular spring 62 or the like. In other words, with the flexible finger type shorting element, the reed can be rigidly mounted to the armature body, which in turn can be pivoted for movement in opposite directions in a single plane.

Figure 11:
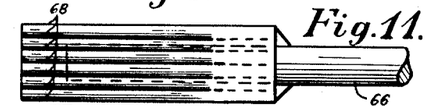
FIGURES 11 and 12 show in detail one modification of a shorting element.
Figure 12:
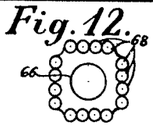
Figure 17:
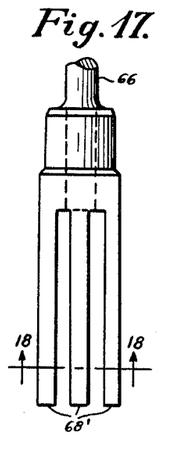
FIGURES 17 and 18 show an alternative modification of a shorting element.

An alternative to the type of shorting element shown in FIGURES 9, 11 and 12, wherein fingers 68 are initially individual pieces of material secured by brazing or the like to reed 66, is the multi-fingered shorting element shown in FIGURE 17, a cross-sectional view of which is illustrated in FIGURE 18. In this case, there are formed from a square piece of material, as by a machining or chemically etching process, square fingers 68' which are spaced one from another, but which are integrally connected at one end of the square piece of material. The upper end of the square material, as viewed in FIGURE 17, is secured to reed 66 in any desirable manner. In this case, the securing may be by a resistance weld or solder for low temperature applications, or may be by an epoxy bond or mechanical crimp for high temperature applications. The reed and fingers 68' may be insulated from each other, if desired, by using an epoxy bond or a crimp with a non-conductive bushing.

A multi-fingered shorting element of the type shown in FIGURE 17 has greater possibilities in high speed production than does the type shown in FIGURE 9, as dimensional control and automatic assembly are more practical than with the brazed assembly. Further, it is also possible with the modification of FIGURE 17 to maintain armature balance by dimensional control, whereas with the brazed contact type of shorting element shown in FIGURE 11, there has to be hand balance because of brazing irregularities. However, the brazed type of shorting elements has a much lower initial cost of manufacture.

An important advantage of the multi-finger type shorting element in addition to those already mentioned herein is its effect on elimination of contact bounce. It is possible to design the flexible fingers of the shorting element in relation to the other parts of my switching device such that for given operating frequencies the motion of the fingers relative to the contacts is rhythmic to an extent that contact bounce is essentially if not entirely eliminated. It should further be pointed out that if desired, the contacts themselves may take the form of flexible fingers, while the movable or shorting element is a solid member.

A further important feature of my invention is the manner in which the reed portion of the device is mounted so that the fingers 68 can be accurately positioned relative to the contacts. It will be appreciated that with the small clearances involved (for example, the total movement of the fingers may be less than one thousandth of an inch) accurate positioning of the fingers relative to the contacts becomes a delicate manufacturing problem. To effectively overcome this problem, the reed 66 is initially assembled with its upper end portion making a loose fit in the cooperating opening of the armature body and soldered thereto. Then, in final assembly, this solder joint is re-heated so that the reed may be moved relative to the armature body to a position such that the fingers are in exact proper relation to the contacts, at which time the solder is again allowed to cool.

Figures 19, 22, 23, 24:
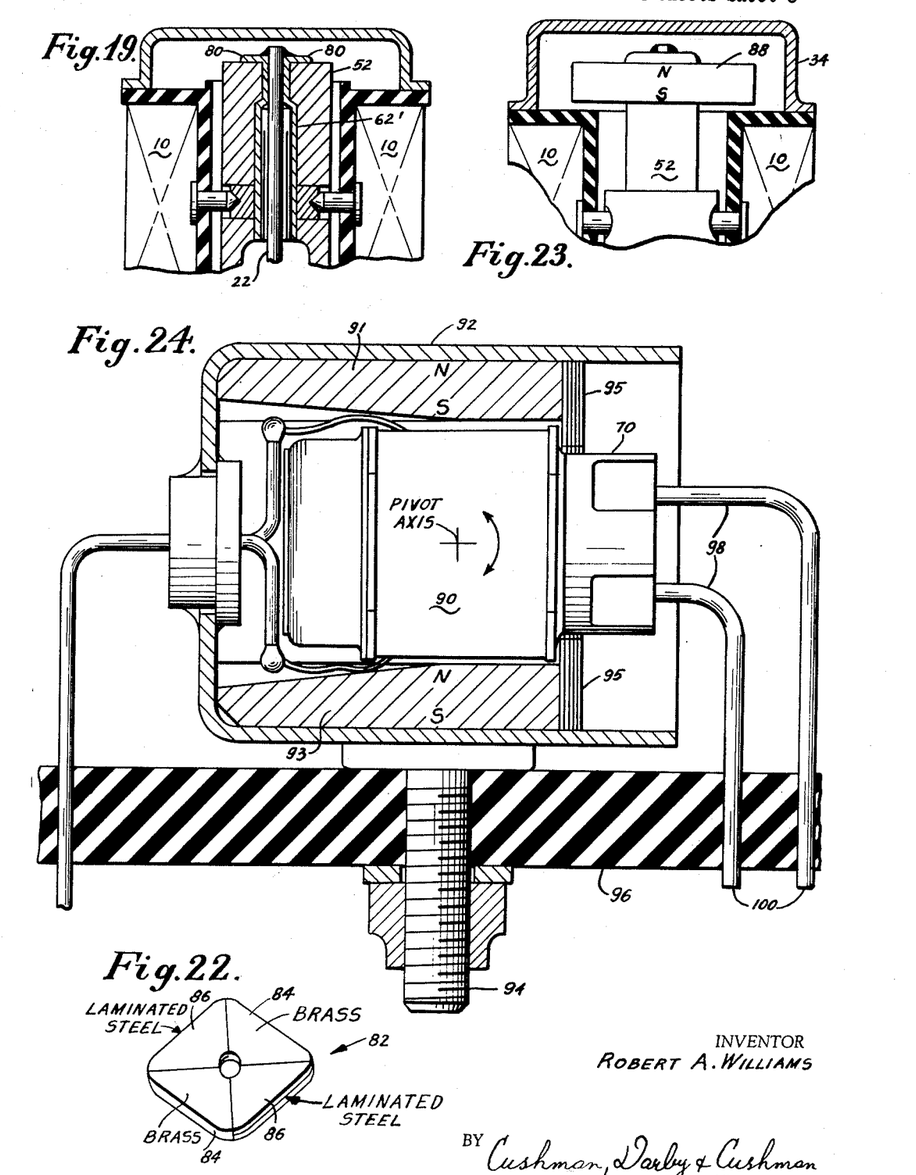
FIGURE 19 illustrates an optional modification of the tubular spring used for resilient mounting of the pivot seats.
FIGURE 22 shows an optional sector which may be employed in the embodiment of FIGURE 9.
FIGURE 23 illustrates a modification of FIGURE 9.
FIGURE 24 shows an encasement in combination with any of the modifications of the switching device.

A modification of the tubular spring 62 of FIGURE 9 is shown in the embodiment of FIGURE 19. In this embodiment, spring 62' extends through an aperture in the end of armature body 52 with the end 80 of the tubular spring being flanged as by spinning, over the end of the armature body. The flanged end is then soldered or otherwise fixedly secured to the armature body. When the armature body is a ceramic magnet, the upper end thereof may be metalized for soldering purposes. Modification of the tubular spring from that shown in FIGURE 9 to that illustrated in FIGURE 19 provides for a more permanent and secure placement of the spring.

Figure 20:
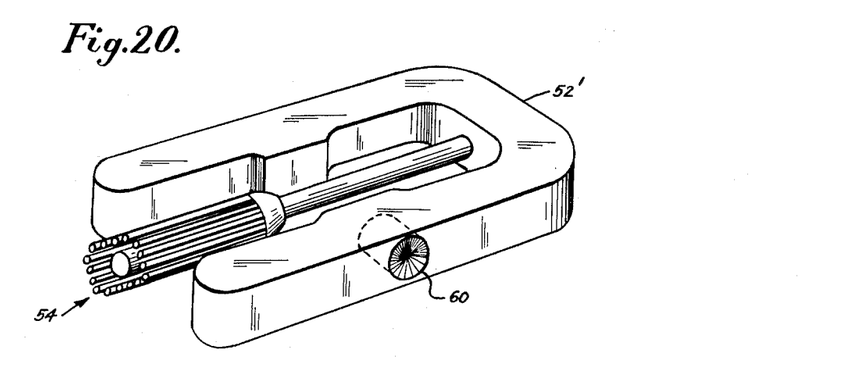
FIGURES 20 and 21 illustrate alternative modifications of flat type armature bodies.
Figure 21:
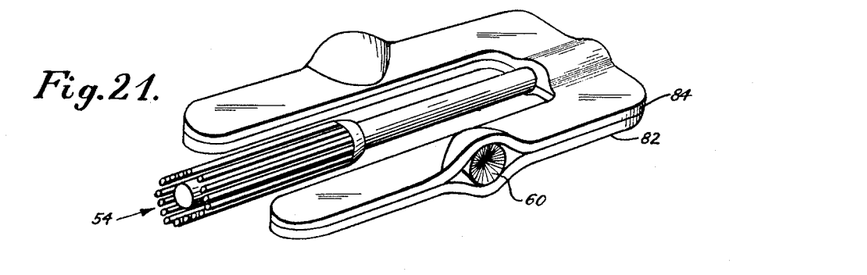

In the embodiment illustrated in FIGURE 9, armature body 52 is illustrated as being of cross-sectional configuration similar to that of the coil form 58, whether such coil form is round, square or rectangular. Limitation to such an armature body is not intended, and as shown in FIGURES 20 and 21, the armature body may be flat so as to provide low inertia in the movement thereof. In FIGURE 20, armature body 52' is made of a single piece of material into a U-shaped form as by blanking same from sheet stock, or slicing it from extruded or rolled high permeability steel. In addition, such an armature body may be permanently magnetized and of whatever materials desired. An alternative flat type armature body, such as the one shown in FIGURE 21, is formed of two parts 82 and 84 resistance welded or otherwise secured together. Each part 82, 84 may be blanked and formed from thin high permeability steel, or may be of the permanent magnet type.

For each of the flat type armature bodies of FIGURES 20 and 21, provision is made for the insertion of either of the above referred to types of shorting elements such as element 54 illustrated. Also, provision is made in these armature bodies for the V type pivot seats 60, again preferably of jewel construction for low friction purposes, and the arms of the armature bodies provide resilient mounting for such seats similar to that provided by tubular spring 62 in FIGURE 9.

With reference again to FIGURE 9, it may be seen that coil form 58 is separated at each of its ends from the respective end caps 34 and 70 by a piece of material designated as inserts 82. A perspective view of each of these inserts is shown in FIGURE 22. As it is illustrated, each insert includes four equal sectors. Sectors 84 are of solid brass construction, while sectors 86 are of laminate steel construction.

It is to be emphasized that the use of either or both of inserts 82 is entirely optional, but the use thereof provides an increased permanent magnet field to the armature, the high permeability laminate sectors 86 serving as pole pieces to provide a minimum air gap. When inserts 82 are not employed in embodiments such as that in FIGURE 9, end caps 34 and 70 may be similar to the respective end caps of FIGURE 1 so as to abut the ends of coil form 58.

FIGURE 23 illustrates a further modification of FIGURE 9. In FIGURE 23, the upper end of armature body 52 is diminished in size, but extends from the coil form aperture for purposes of carrying permanent magnet 88. This magnet may be similar to magnet 28 of FIGURE 1. The addition of such a magnet in FIGURE 23 provides for normally open or normally closed action as desired. Instead of employing a magnet, the upper end of armature body 52 may carry an iron washer for purposes of providing snap action to the device, particularly when the device is encased in a manner similar to that shown in FIGURE 24.

It is to be understood that the casing of FIGURE 24 is applicable not only to the basic switching device of FIGURE 23, but to any of the other embodiments of this invention, as desired, and accordingly numeral 90 refers to any such device. At the top and bottom of casing 92 there are preferably disposed two permanent magnets 91, 93 with the polarities thereof facing each other being opposites. For shielding purposes, laminations 95 of netic and co-netic material are respectively employed to substantially complete the enclosure of the magnetic circuit and to provide electrostatic shielding for the contacts in end cap 70. With such shielding full utilization of the coil's energy for motion and low power requirements are effected. The space otherwise surrounding end cap 70 is preferably filled with epoxy.

It is to be noted relative to FIGURE 24 that encasement 92 is provided with a threaded stud 94 so that the entire unit may be releasably attached to a circuit board 96. Additionally, an important aspect of this invention is the elimination of effects of contact, thermal, and electrostatic E.M.F.'s. Such E.M.F.'s, though very small in magnitude, can if present cause serious difficulties at the low signal levels involved in some applications of the electromagnetic switching device of my invention. It will be noted from the drawings (see FIGURE 24) that the contacts 98 extend as a single piece from within cap 70, preferably through circuit board 96 so as to be available thereat as terminals 100. Since each contact and its lead is a single integral piece of material, there are no thermal junctions, and hence no thermal E.M.F.'s are generated. It should also be noted that instead of making an external electric circuit by bringing a pair of contacts (which are connected to the external circuit leads) together as in the prior art of which I am aware, such contacts in accordance with my invention are always bridged or shorted by a third conductive element (e.g., the fingers 68 associated with reed 66). This bridging or shorting of contacts is accomplished within a very small space within the switching device interior so that there is no chance of a temperature gradient existing at the contacts. Thus, any thermal, contact, or electrostatic E.M.F.'s that may be present at the juncture of one contact and the bridging element are also identically present, but opposite in sense at the other bridging element-contact juncture, and thus are cancelled. In this way, the effects of thermal, contact, and electrostatic E.M.F.'s are entirely eliminated.

From the foregoing description of the different embodiments and modifications of this invention, it is apparent that there is provided an electromagnetic switching device which may be hermetically sealed. This is contemplated, and with reference to FIGURE 9, for example, the enclosure about the contacts and armature assembly is preferably filled with a gaseous element such as dry nitrogen.

Figure 25:
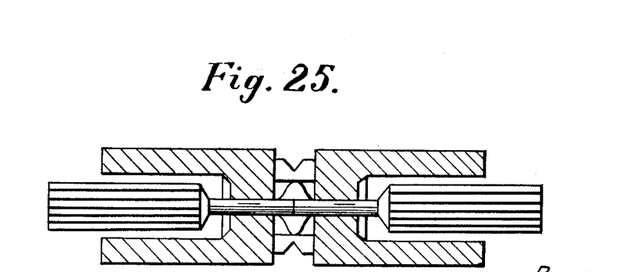
FIGURE 25 illustrates in part a double-throw, double-pole switching device.

This invention is also adaptable to form double-pole, double-throw switching configurations, as reference to FIGURE 25 will indicate. Each half of this embodiment of the invention is similar to that shown in FIGURE 9, with the pivot seats 60 being at the center of the embodiment, and resiliently mounted as by springs 102. Other multiple configurations may also be constructed in a similar manner.

The invention as embodied in any one of the different modifications above referred to, provides for robust, simple design allowing micro-miniaturization. The encasement of FIGURE 24 may be as small as .20" x .25" x .40", which indicates miniaturization to an extreme heretofore unavailable with the entire casement being generally smaller than the socket used to mount conventional switching devices.

A switching device made in accordance with this invention provides an extremely low noise factor. This is accomplished by the low power requirements (improved efficiency) and contact configuration, casement configuration with added shielding, and also the very small external magnetic field. Besides being able to withstand extreme shock or vibration as above indicated, high temperatures may also be withstood. Because of the contact configuration, there is less contact "OFF" time and there is less contact clearance required for a given contact load as the contact shorting element breaks in two places instead of the conventional one. In addition, there is elimination of contact bounce with a desirable wiping action resulting.

Conventional switching devices of the type similar to those described in this application, have an electrical connection to a rigidly mounted reed and require about 1.5 volts for an 80 ohm coil to start weak oscillation. However, a switching device built in accordance with this invention requires only an extremely low initial starting current. For operation at the resonant frequency of the reed, less than 1 volt for a 6000 ohm coil is required.

The balanced free pivoting armature asembly as resiliently mounted eliminates shock problems of prior art devices, and also eliminates the additional driving force required to bend a reed (at other than its resonant point) which is immovably secured, but maintains use of the reed's resonant characteristics. Further, both poles of the coil provide usable motive force and extremely strong switching action, more than doubling that obtainable when only one-half of the coils magnetic force is usuable as in similar prior art devices.

Thus, it is apparent that there is provided by this invention apparatus in which the various objects and advantages herein set forth are successfully achieved.

Modifications of this invention not described herein will become apparent to those of ordinary skill in the art after reading this disclosure. Therefore, it is intended that the matter contained in the foregoing description and the accompanying drawings be interpreted as illustrative, and not limitative, the scope of the invention being defined in the appended claims.

I claim:
1. In an electromagnetic device having coil means defining an elongated aperture, an armature assembly, means including means at least partially in said aperture for mounting said assembly for at least pivotal move- ment thereof in said aperture, said armature assembly comprising an armature body to which said mounting means is connected, a reed connected to said armature body and protruding from said aperture at at least one end thereof, said armature body protruding from the other end of said aperture, means at least magnetizable disposed on one of said protruding ends for at least aiding in causing pivotal movement of said armature assembly in response to energization of said coil means, and at least two contacts fixed relative to said coil means and disposed adjacent said armature and bridgeable by a given portion of said armature assembly.

2. A device as in claim 1 wherein the protruding end of said armature body acts as a bridging element for shorting said two contacts, said magnetizable means being disposed on the protruding end of said reed.

3. A device as in claim 1 wherein said armature body has an aperture substantially throughout its length with said reed being disposed in said aperture and connected substantially at the protruding end of the armature body.

4. A device as in claim 1 wherein the part of said mounting means which is at least partially in said aperture includes a ferrous core, and said mounting means includes pivoting means connected to said ferrous core.

5. A device as in claim 4 wherein said ferrous core protrudes as a flange from said aperture at the reed protruding end of the aperture.

6. A device as in claim 1 wherein the coil means is supported by a bobbin-like coil form and each of said protruding ends is enclosed by a cap connected to said coil form, one of said caps being of non-metallic material and enclosing said two contacts, the other of said caps being of ferrous material.

7. A device as in claim 6 wherein the coil form and the non-metallic end cap are integral.

8. A device as in claim 1 wherein the protruding end of said armature body acts as a shorting element for shorting said two contacts, said reed being connected to the armature body at the end thereof opposite the protruding end of the body, the arrangement being such that said armature assembly may be pivoted at a relatively high frequency.

9. A device as in claim 1 wherein said magnetizable means is disposed on the protruding end of the armature body and said contacts are disposed adjacent the protruding end of said reed.

10. In an electromagnetic switching device having coil means adapted to receive electrical excitation, means including a bobbin-like structure for carrying said coil means and means including end caps associated with said bobbin structure for forming a sealed enclosure, said structure defining internally thereof an elongated aperture, armature means disposed at least partially within said aperture and mounted on said structure for movement at least in two opposing directions from an equilibrium position, said armature means including at least one contact shorting element extending to within one of said end caps, and at least one pair of electrical contacts each extending insulatively of each other through said one end cap and having a contact surface inside thereof, said contact surfaces being disposed generally on opposite sides of said shorting element with at least a part of each surface diverging with respect to one another so that when the armature means moves toward said contact surfaces due to said excitation, the shorting element then positively contacts said diverging part of each of said contact surfaces so as to electrically interconnect said contacts, each of said contacts consisting of a single piece of material extending at least from its contact surface to a point outside said one end cap.

11. In an electromagnetic switching device having coil means adapted to receive electrical excitation, means including a bobbin-like structure for carrying said coil means and means including end caps associated with said bobbin structure for forming a sealed enclosure, said structure defining internally thereof an elongated aperture, armature means disposed at least partially within said aperture and mounted on said structure for movement at least in two opposing directions from an equilibrium position, said armature means including at least one contact shorting element extending to within one of said end caps, and two pairs of electrical contacts each extending insulatively of each other through said one end cap and having a contact surface inside thereof, each pair of contact surfaces being disposed at least mainly on opposite sides of a transverse plane passing through said equilibrium position orthogonal to a plane including said two opposing directions, the contact surfaces of each contact in each pair thereof being further disposed generally on opposite sides of said last mentioned plane with at least a part of each surface diverging with respect to its paired contact surface toward said transverse plane so that when the armature means moves toward either pair of contact surfaces due to said excitation, the shorting element then positively contacts the diverging part of each of the contact surfaces in that pair so as to electrically interconnect said contacts.

12. In an electromagnetic switching device having coil means adapted to receive electrical excitation, means including a bobbin-like structure for carrying said coil means and means including end caps associated with said bobbin structure for forming a sealed enclosure, said structure defining internally thereof an elongated aperture, armature means disposed at least partially within said aperture and mounted on said structure for movement at least in two opposing directions from an equilibrium position, said armature means including at least one contact shorting element extending to within one of said end caps, and two pairs of electrical contacts each extending insulatively of each other through said one end cap and having a contact surface inside thereof, each pair of contact surfaces being disposed at least mainly on opposite sides of a transverse plane passing through said equilibrium position orthogonal to a plane including said two opposing directions, the contact surfaces of each contact in each pair thereof being further disposed generally on opposite sides of said last mentioned plane with at least a part of each surface diverging with respect to its paired contact surface toward said transverse plane so that when the armature means moves toward either pair of contact surfaces due to said excitation, the shorting element then positively contacts the diverging part of each of the contact surfaces in that pair so as to electrically interconnect said contacts, each of said contacts consisting of a single piece of material extending from its contact surface to the opposite end thereof at which the contacts form terminals disposed in areas having substantially the same temperature at all times during excitation of said coil means.

13. In an electromagnetic switching device having coil means adapted to receive electrical excitation, means including a bobbin-like structure for carrying said coil means and means including end caps associated with said bobbin structure for forming a sealed enclosure, said structure defining internally thereof an elongated aperture, armature means disposed at least partially within said aperture and mounted on said structure for movement at least in two opposing directions from an equilibrium position, said armature means including at least one contact shorting element extending to within one of said end caps, and at least one pair of electrical contacts each extending insulatively of each other through said one end cap, and having a contact surface inside thereof, said contact surfaces being disposed generally on opposite sides of said shorting element, each of said contacts consisting of a single piece of material extending at least from its contact surface to a point outside said one end cap.

14. In an electromagnetic switching device having coil means adapted to receive electrical excitation, means including a bobbin-like structure for carrying said coil means and means including end caps associated with said bobbin structure for forming a sealed enclosure, said structure defining internally thereof an elonagted aperture, armature means disposed at least partially within said aperture and mounted on said structure for movement at least in two opposing directions from an equilibrium position, said armature means including at least one contact shorting element extending to within one of said end caps, and at least one pair of electrical contacts each extending insulatively of each other through said one end cap and having a contact surface inside thereof, said contact surfaces being disposed generally on opposite sides of said shorting element with at least a part of each surface diverging with respect to one another so that when the armature means moves toward said contact surfaces due to said excitation, the shorting element then positively contacts said diverging part of each of said contact surfaces so as to electrically interconnect said contacts, each of said contacts consisting of a single piece of material extending from its contact surface to the opposite end thereof at which the contacts form terminals disposed in areas having substantially the same temperature at all times during excitation of said coil means.

15. An electromagnetic switching device comprising coil means adapted to receive electrical excitation, means including a bobbin-like structure for carrying said coil means and two end caps, and means including said end caps and said bobbin-like structure for forming a sealed enclosure, said structure defining internally thereof an elongated aperture, armature means disposed at least partially within said aperture and mounted on said last mentioned means for movement at least in two opposing directions from an equilibrium position, said armature means including at least one contact shorting element extending to with one of said end caps, and at least one pair of electrical contacts each extending insulatively to each other through said one end cap and having a contact surface inside thereof, said contact surfaces being disposed generally on opposite sides of said shorting element with at least a part of each surface diverging with respect to one another so that when the aramture means moves toward said contact surfaces due to said excitation, the shorting element then positively contacts said diverging part of each of said contact surfaces so as to electrically interconnect said contacts, and an encasement around at least said one end cap, each of said contacts consisting of a single piece of material extending from its contact surface through one said end cap to a terminal point.

16. An electromagnetic switching device comprising coil means adapted to receive electrical excitation, means including a bobbin-like structure for carrying said coil means and two end caps, and means including said end caps and said bobbin-like structure for forming a sealed enclosure, said structure defining internally thereof an elongated aperture, armature means disposed at least partially within said aperture and mounted on said last mentioned means for movement at least in two opposing directions from an equilibrium position, said armature means including at least one contact shorting element extending to within one of said end caps, and at least one pair of electrical contacts each extending insulatively to each other through said one end cap and having a contact surface inside thereof, said contact surfaces being disposed generally on opposite sides of said shorting element so as to electrically interconnect said contacts, and an encasement around at least said one end cap, each of said contacts consisting of a single piece of material extending from its contact surface through one said end cap to a terminal point.

17. In an electromagnetic switching device having coil means and means including said coil means defining an elongated aperture, an armature assembly mounted in said aperture and movable in two opposite directions about an axis, said armature assembly comprising an armature body and a shorting element disposed within said body and fixedly secured at one end to the armature body, the other end of said shorting element being free of said armature body and protruding therefrom, at least one pair of spaced apart electrical contacts disposed adjacent the protruding end of said shorting element, the protruding end of the shorting element including a plurality of flexible fingers movable with respect to one another and forming in cross-section a predetermined geometrical configuration, said two contacts having end edges forming relative to one another a similar geometrical configuration, oriented in matching relation relative to said fingers so that each time the armature assembly is moved in a given direction toward said contacts in response to energization of said coil means said contacts are positively contacted by at least a part of said fingers even if one of the contacts is contacted before the other.

18. A device as in claim 17 wherein said armature assembly protrudes from said aperture at the end thereof opposite the end through which said shorting element protrudes, and means at least magnetizable disposed on the armature assembly protruding from said opposite end.

19. A device as in claim 18 wherein said magnetizable means is a permanent magnet.

20. A device as in claim 18 wherein said magnetizable means is of ferrous material.

21. A device as in claim 17 and further including two other adjacent contacts disposed to be contacted by the fingers of said shorting element when moved in a direction opposite to said given direction.

22. A device as in claim 21 wherein the fingers of said shorting element form a square and the contact surfaces of said four contacts also form a square surrounding said fingers.

23. A device as in claim 17 including a bobbin-like coil form for supporting said coil means, end caps disposed on opposite ends of said coil form and so as to fully enclose the armature assembly, one of said end caps being of non-magnetic material, said contacts extending through said one end cap and being continuous from their respective contact surfaces therewithin to at least a point outside said one end cap, the other end cap being of metallic material.

24. A device as in claim 23 and further including at least between one of said end caps and the adjacent part of said coil form a segmented piece of material with alternate segments being of brass and steel, said steel segments being laminated.

25. A device as in claim 17 wherein the armature body is flat and U-shaped.

26. A device as in claim 25 wherein the armature body is formed by two preformed pieces of metal secured together.

27. A device as in claim 17 and further including an encasement having two permanent magnets disposed on opposite sides thereof with opposite poles of the magnets facing each other, said opposite sides of the encasement being respectively those toward which said armature assembly may be pivoted.

28. A device as in claim 27 and further including laminated magnetic-electrostatic shielding material disposed adjacent the protruding end of said shorting element.

29. A device as in claim 17 wherein the periphery of said armature body forms a configuration substantially similar to that of the coil means aperture.

30. A device as in claim 17 wherein the geometrical configuration of the fingers of said shorting element is substantially a square and the ends of said contacts are substantially at right angles to each other and are disposed to be contacted respectively by at least one finger of adjacent sides of said square.

31. A device as in claim 17 wherein said fingers are individually connected to one end of a reed, the other end of which is fixedly secured to said armature body.

32. A device as in claim 17 wherein the shorting element includes means integrally connecting the shorting fingers together at the end thereof opposite their free ends, and reed means connecting the last mentioned means to said armature body in said fixedly secured manner.

33. A device as in claim 1 wherein the means at least magnetizable is a permanent magnet.

34. A device as in claim 1 and further including an iron ring at least substantially around said magnetizable means.

35. A device as in claim 17 wherein said armature body is a permanent magnet.

36. A device as in claim 17 wherein said armature body is of high permeability metal.

37. In an electromagnetic switching device having an armature assembly, means supporting said assembly for movement in two opposite directions about an axis, said armature assembly comprising an armature body and a shorting element fixedly secured at one end to the armature body, the other end of said shorting element being free of said armature body and including a plurality of opposed flexible fingers movable with respect to one another and forming in cross-section the periphery of a predetermined geometrical configuration in which opposed fingers thereof are spaced from each other, at least one pair of spaced apart electrical contacts disposed adjacent said fingers, said contacts having end edges forming relative to one another a geometric configuration similar to that of said fingers, and oriented in matched relation relative to said fingers, so that each time the armature assembly is moved in a given direction toward said contacts, said contacts are positively contacted by at least a part of said fingers.

38. For use in an electromagnetic switching device including an armature assembly, means supporting said assembly for movement in two opposite directions about an axis, a shorting element comprising a rod portion fixedly secured at one end to said armature and a plurality of opposed fingers fixedly secured to the free end of said rod portion and extending outwardly therefrom and forming in cross-section the periphery of a predetermined geometrical configuration in which opposed fingers thereof are spaced from each other and at least a pair of contacts disposed adjacent said fingers, whereby they will be contacted by at least a portion of said fingers upon predetermined movement of said armature assembly.

39. A device as in claim 38 wherein each of the opposed fingers is an independent member all of which are secured to said rod portion.

40. A device as in claim 38 wherein the opposed fingers are integrally connected at said one end but are separated one from the other a predetermined amount at their contact end.

41. An electromagnetic switching device comprising coil means adapted to receive electrical excitation, means including a bobbin-like structure for carrying said coil means and two end caps, and means including said end caps and said bobbin-like structure for forming a sealed enclosure, said structure defining internally thereof an elongated aperture, armature means disposed at least partially within said aperture and mounted on said last-mentioned means for movement in two opposing directions from an equilibrium position, said armature means including a contact shorting element, at least one pair of electrical contacts disposed to be bridged by said shorting element, and a magnetic circuit surrounding said coil means and comprising a pair of permanent magnets in juxtaposed relation to said bobbin-like structure on opposite sides thereof.

References Cited by the Examiner

UNITED STATES PATENTS

| | | | |
|---|---|---|---|
| 1,071,769 | 9/13 | McCready | 200—87 |
| 1,215,590 | 2/17 | Thompson | 200—104 |
| 1,305,970 | 6/19 | Kennedy | 200—104 |
| 1,705,518 | 3/29 | Gurney | 200—90.4 |
| 2,026,772 | 1/36 | Dressel | 200—90.1 |
| 2,092,478 | 9/37 | Sommermeyer | 200—87 |
| 2,093,198 | 9/37 | Kleinmann | 200—166 |
| 2,732,459 | 1/56 | Pollard | 200—166 |
| 2,810,037 | 10/57 | Faus et al. | 200—87 |
| 2,842,636 | 7/58 | Foster | 200—90.1 |
| 2,944,324 | 7/60 | Moyer | 29—155.5 |
| 2,946,876 | 7/60 | Lockwood et al. | 200—104 |
| 2,951,134 | 8/60 | Lazich | 200—104 |
| 2,961,745 | 11/60 | Smith | 29—155.5 |
| 2,962,804 | 12/60 | Nelsen | 29—155.55 |

FOREIGN PATENTS 1,104,402   6/55   France.

BERNARD A. GILHEANY, *Primary Examiner.*

MAX L. LEVY, ROBERT K. SCHAEFER, *Examiners.*